(12) United States Patent
Tsuyuki et al.

(10) Patent No.: US 7,887,318 B2
(45) Date of Patent: Feb. 15, 2011

(54) MOLD ASSEMBLY FOR MOLDING TAPERED FLANGE

(75) Inventors: Seiji Tsuyuki, Odawara (JP); Yosuke Sumiya, Odawara (JP); Shozo Onmori, Odawara (JP)

(73) Assignee: Fujifilm Corporation, Tokyo (JP)

( * ) Notice: Subject to any disclaimer, the term of this patent is extended or adjusted under 35 U.S.C. 154(b) by 177 days.

(21) Appl. No.: 12/203,963

(22) Filed: Sep. 4, 2008

(65) Prior Publication Data

US 2009/0057462 A1    Mar. 5, 2009

(30) Foreign Application Priority Data

Sep. 4, 2007    (JP) .............................. 2007-228623

(51) Int. Cl.
*B29C 33/42* (2006.01)
(52) U.S. Cl. .................................. 425/470; 425/129.1
(58) Field of Classification Search .............. 425/129.1, 425/542, 470
See application file for complete search history.

(56) References Cited

U.S. PATENT DOCUMENTS 6,962,305 B2 * 11/2005 Morita ........................ 242/348
7,270,780 B2 * 9/2007 Satoh et al. .............. 425/129.1

FOREIGN PATENT DOCUMENTS

JP    2002-245745    8/2002

* cited by examiner

*Primary Examiner*—James Mackey
(74) *Attorney, Agent, or Firm*—Young & Thompson

(57) ABSTRACT

A tape reel assembly comprises a reel hub and flanges coaxially secured to, and extending radially outwardly from, opposite axial ends of the reel hub, respectively, each flange being molded by resin injection molding and having a tapered inside surface sloping down at a fixed taper angle from an inside periphery to an outside periphery thereof. The flange is molded by the use of an injection mold having a mold surface which borders at least a part of a mold cavity for configuration of the tapered inside surface of the flange and is convexly curved to the mold cavity.

2 Claims, 13 Drawing Sheets

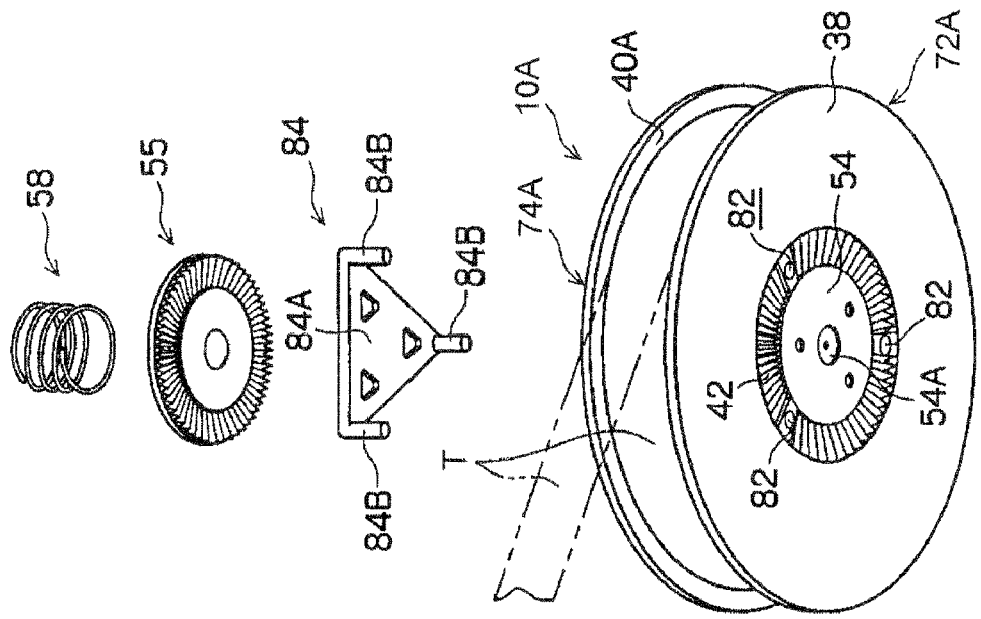
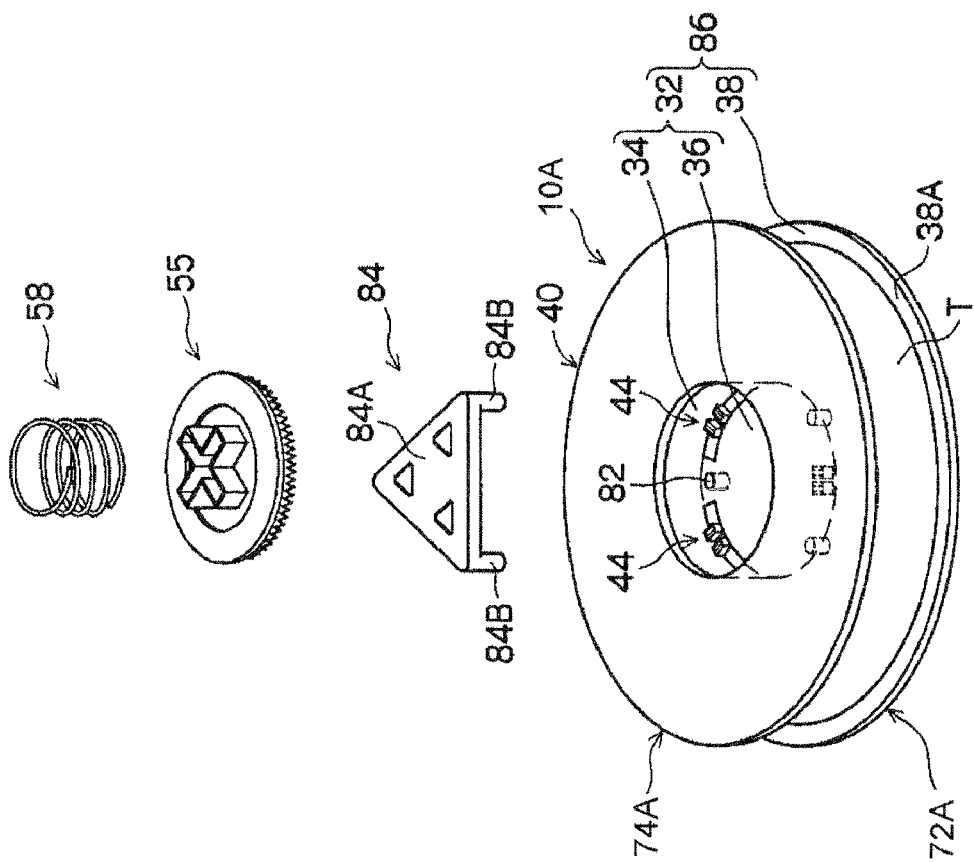
Fig. 11(A)
Fig. 11(B)

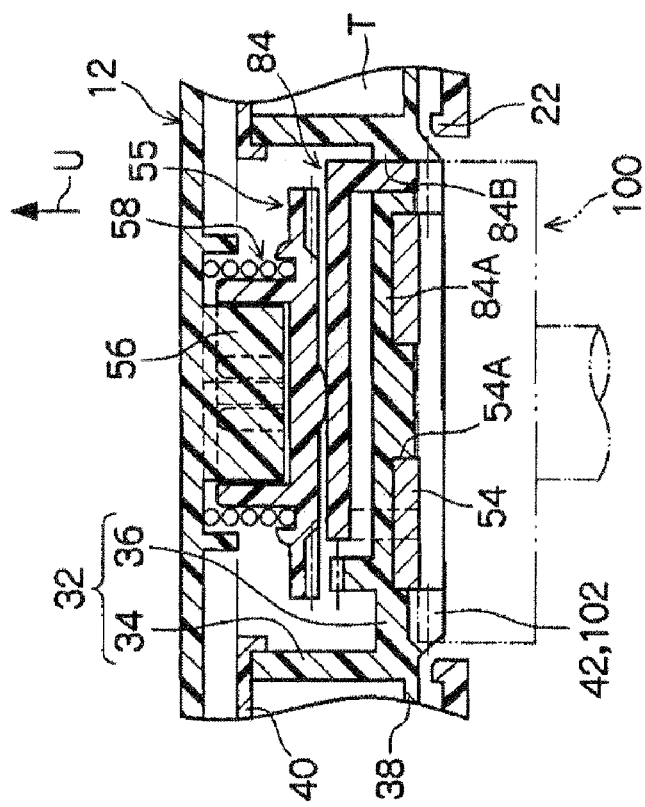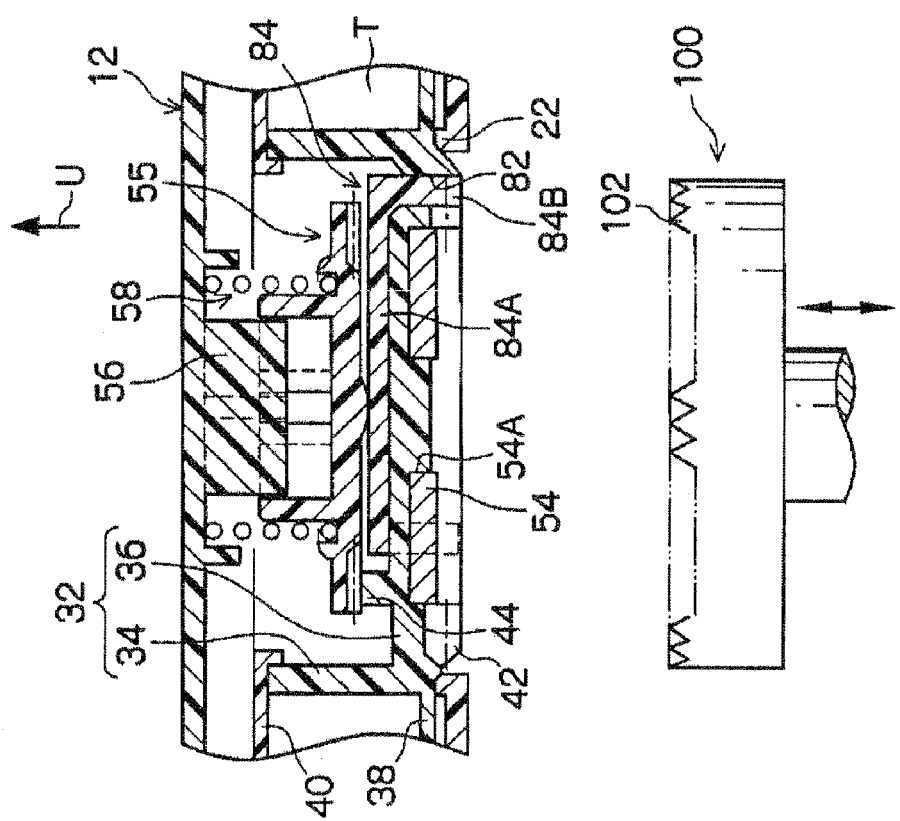
Fig. 12(B)
Fig. 12(A)

MOLD ASSEMBLY FOR MOLDING TAPERED FLANGE

BACKGROUND OF THE INVENTION

1. Field of the Invention

The present invention relates to a method of molding a flange for a tape reel assembly around which a recording tape is wound and which comprises a reel hub and at least one flange coaxially secured to, and extending radially outwardly from one of opposite axial ends of the reel hub, a tape reel assembly having the flange and a tape cartridge having the tape reel assembly with a recording tape wound therearound.

2. Description of Related Art

In order for a magnetic tape to make both a positioning error signal (PES) which is a value indicating non-uniformity dislocation or a value of a standard deviation of positional dislocation and off-track as small as possible, it has been known from, for example, JP2002-245745A to use a tape reel having a winding shaft which is tapered at an angle of 0.01 to 0.1 degree so as to have a diameter gradually increasing toward an end thereof on a side of an edge of the magnetic tape serving as a reference side for running the magnetic tape. The tape reel further has opposed flanges at an axial distance greater than an upper limit tape width in a range of from 0.204 to 0.224 mm at an innermost position or necks connecting to the winding shaft and a face-to-face axial distance greater than an upper limit tape width in a range of from 0.484 to 0.504 mm at an outermost position or a peripheral position. That is, the flanges of the tape reel are shaped so as to have a face-to-face axial distance greater at an outside periphery than at an inside periphery thereof. However, nothing in the prior art teaches in what shape and how the flanges of the tape reel are manufactured.

SUMMARY OF THE INVENTION

It is an object of the present invention to provide a method of molding a flange for a tape reel assembly having a flange with a well tapered inside surface formed thereon, a tape reel assembly having the flange and a tape cartridge having the tape reel assembly.

One aspect of the present invention relates to manufacturing a flange having a tapered inside surface sloping at a fixed taper angle from an inside periphery to an outside periphery thereof which is coaxially secured to, and extending radially outwardly from one of opposite axial ends of a reel hub of a tape reel assembly around which a recording tape is wound by using a resin injection mold assembly for manufacturing. The resin injection mold assembly having a mold cavity for molding the flange has a mold surface which borders at least a part of the mold cavity configuring the tapered inside surface of the flange and is shaped convexly to the mold cavity. A resin material is injected into the mold assembly, and cooled or solidified and then removed as a molded flange from the mold assembly. The molded flange has an tapered surface significantly improved in surface precision as compared with one manufactured by conventional molding, resulting from the mold surface shaped convexly to the mold cavity which borders a part of the mold cavity for configuring the tapered inside surface of the flange. The mold surface may comprise a plurality of surface sections sloping at different taper angles gradually decreasing from the inside periphery to the outside periphery. It is preferred for the mold surface to have one of the surface sections closest to the inside periphery sloping a taper angle greater than a normal design taper angle of the flange and one of the surface sections closest to the outside periphery sloping a taper angle smaller than the normal design taper angle of the flange. In the case where the mold surface comprises three surface sections, namely an inner surface section closest to the inside periphery, an intermediate surface section and an outer surface section closest to the outside periphery, it is preferred to configure the inner surface section sloping at a taper angle taper angle greater than a normal design taper angle of the flange, an intermediate surface section sloping at a taper angle substantially equal to the normal design taper angle and the outer surface section sloping at a taper angle smaller than the normal design taper angle of the flange. Since the mold surface of the mold assembly comprises the surface sections sloping at different taper angles gradually decreasing, in other words, has a convex surface, it is facilitated to fabricate the mold assembly.

Another aspect of the present invention relates to a tape reel assembly for winding a recording tape thereon. The tape reel assembly comprises a reel hub forming a cylindrical tape-winding core, a first flange coaxially secured to, and extending radially outwardly from one of opposite axial ends of the reel hub, and a second flange coaxially secured to, and extending radially outwardly from the other of the opposite axial ends of the reel hub. At least one of the first and the second flange is manufactured by the use of the mold assembly described above. The tape reel assembly having at least one flange with a tapered surface manufactured precisely by the mold assembly facilitates precise winding of a recording tape thereon and maintains a tape role well wound thereon.

A further aspect of the present invention relates to a recording tape cartridge including the tape reel assembly described above and a cartridge casing for rotatably housing the tape reel assembly therein. The recording tape cartridge including the tape reel assembly capable of precisely winding a recording tape thereon and maintains a recording tape role well wound thereon enables the recording tape to run stably.

BRIEF DESCRIPTION OF THE DRAWINGS

The foregoing and other objects and features of the present invention will be clearly understood from the following detailed description when reading with reference to the accompanying drawings in which same or similar parts and assemblies are denoted by the same reference numerals throughout the drawings and wherein:

FIG. 11(A) is a perspective top view of an alternative tape reel assembly including a lock/unlock structure according to the present invention;

FIG. 11(B) is a perspective bottom view of the alternative tape reel assembly including a lock/unlock structure according to the present invention;

FIG. 12(A) is a partial cross sectional view of an alternative tape cartridge before use according to the present invention;

FIG. 12(B) is a partial cross sectional view of the alternative tape cartridge in use.

DETAILED DESCRIPTION OF THE PREFERRED EMBODIMENTS

Figure 1:
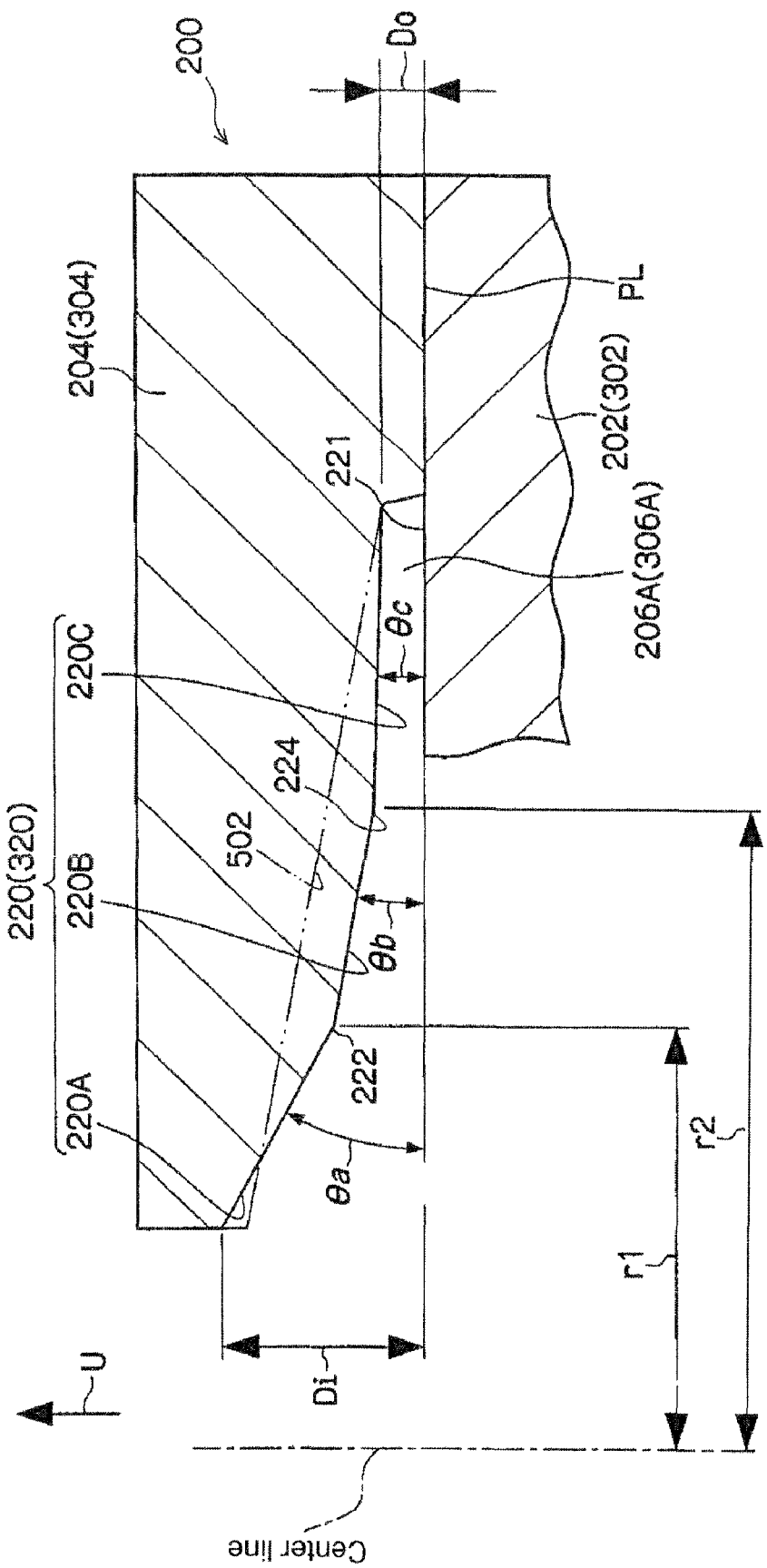
FIG. 1 is an enlarged cross-sectional view of an essential part of a metal mold forming a part of a mold assembly for molding one of tapered flanges of a tape reel assembly according to an embodiment of the present invention.

In the following description, arrows A and U as used herein shall indicate directions in which front and upper sides of a recording tape cartridge are directed respectively when the recording tape cartridge is loaded into a tape drive unit. The tape drive unit is known in various forms and may take any form well known in the art.

Referring to the accompanying drawings in detail and, in particular, to FIGS. 5, 6, 7A and 7B showing a recording tape cartridge 11 according to an embodiment of the present invention, the recording tape cartridge 11 includes a cartridge casing 12, one tape reel assembly 10, a magnetic tape T as a data storage tape, a brake device 55, and a clutch device 60. The cartridge casing 12 comprises a case shell made up of two mating shell halves, namely an upper or top mating shell half 14 and a lower or bottom mating shell half 16 coupled to each other. Specifically, the top mating shell half 14 comprises a generally rectangular top wall section 14A and a side wall section 14B extending upright along the edge of the top wall section 14A which are formed as a single piece. Similarly, the bottom mating shell half 16 comprises a bottom wall section 16A approximately corresponding in shape to the top wall section 14A and a side wall section 16B extending upright along the edge of the bottom wall section 16A which are formed as a single piece. The top and bottom mating shell halves 14 and 16 are firmly coupled by connecting the side wall sections 14B and 16B abutted to each other by ultrasonic welding or set screws to form a box-shaped case shell for the cartridge casing 12. The cartridge casing 12 is provided with a tape egress/ingress opening 18 as a tape egress/ingress slot inclined to the loading direction A by making cutouts in respective corners of the top and bottom mating shell halves 14 and 16. The cartridge casing 12 is provided with a circular center opening 20 which is formed in the bottom wall section 16A of the bottom mating shell half 16 and provided with an annular rib 22 formed as an integral part of the bottom wall section 16A and extending inwardly from an edge of the center opening 20. The center opening 20 facilitates access to the tape reel assembly 10 (see FIG. 4) by a drive chuck 100 of a tape drive unit (not shown).

Figure 5:
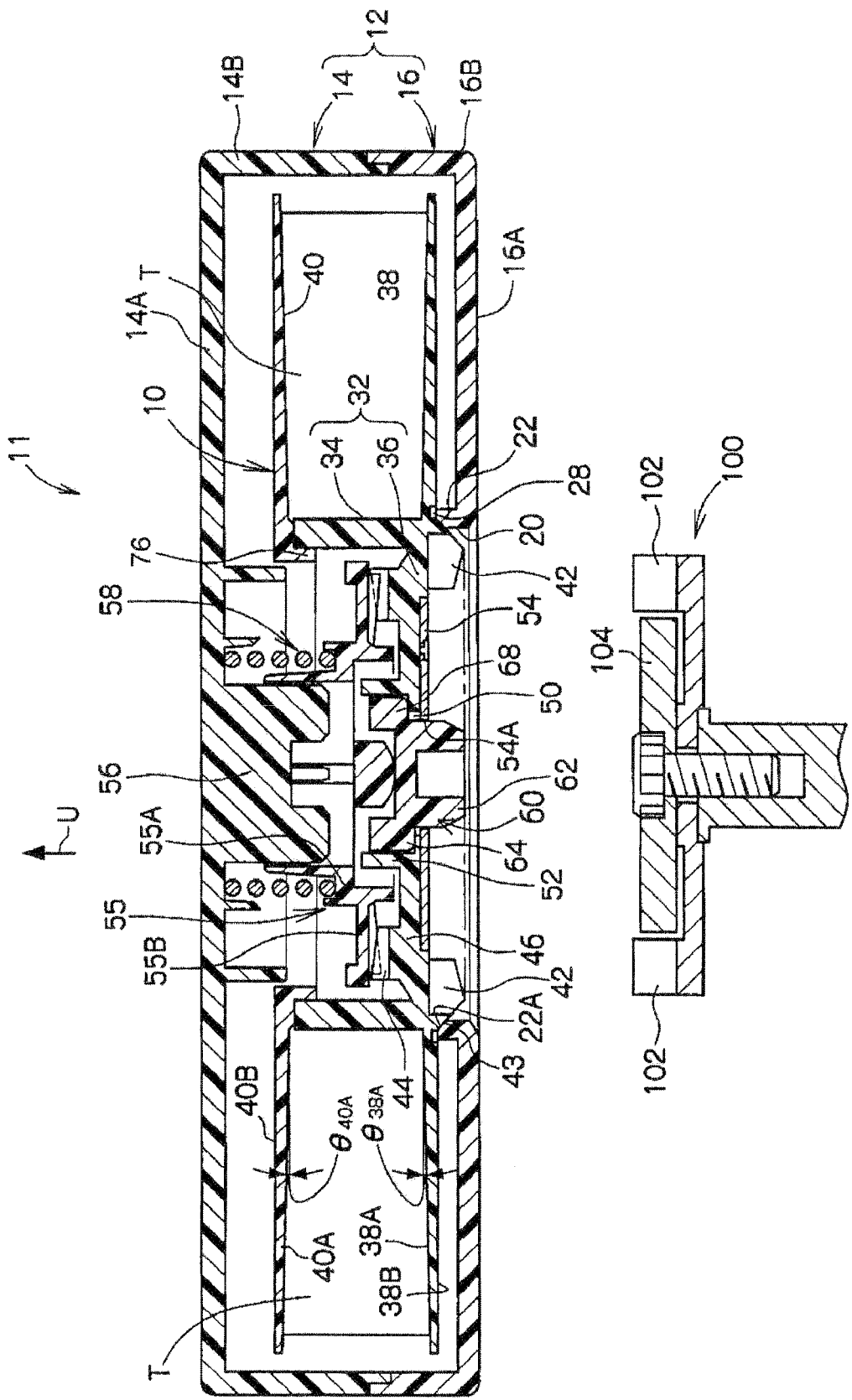
FIG. 5 is a cross sectional view of a recording tape cartridge according an embodiment of the present invention before use.

As shown in FIG. 5, the tape reel assembly 10 is housed and supported for rotation in the cartridge casing 12. The magnetic tape T for data storage which, in turn, is wound around the tape reel assembly 10 and includes a free-end attached to a leader block 30. The leader block 30 lies behind the tape egress/ingress opening 18 and blocks the tape egress/ingress opening 18 to prevent ambient dusts from entering the cartridge interior through the tape egress/ingress opening 18 while the recording tape cartridge 11 is not used. On the other hand, the leader block 30 is pulled out of the cartridge casing 12 by the tape drive unit such that magnetic tape T can be threaded to a take-up reel (not shown) of the tape drive unit.

The leader block 30 is known in various forms in the art and may take any form well known in the art. Alternatively, the leader block 30 may be replaced with a leader pin or a leader tape well known in the art. In such a case, the cartridge casing 12 is desirably provided with a door member rotated closed to prevent ambient dusts from entering the cartridge interior through the tape egress/ingress opening 18 while the recording tape cartridge 11 is not used and rotated open to permit tape movement into and out of the cartridge interior via the tape egress/ingress opening 18. Further, the tape egress/ingress opening 18 may be formed by making a cutout in the side wall section 14B or 16B of either one of the top and bottom mating shell halves 14 and 16.

Figure 4:
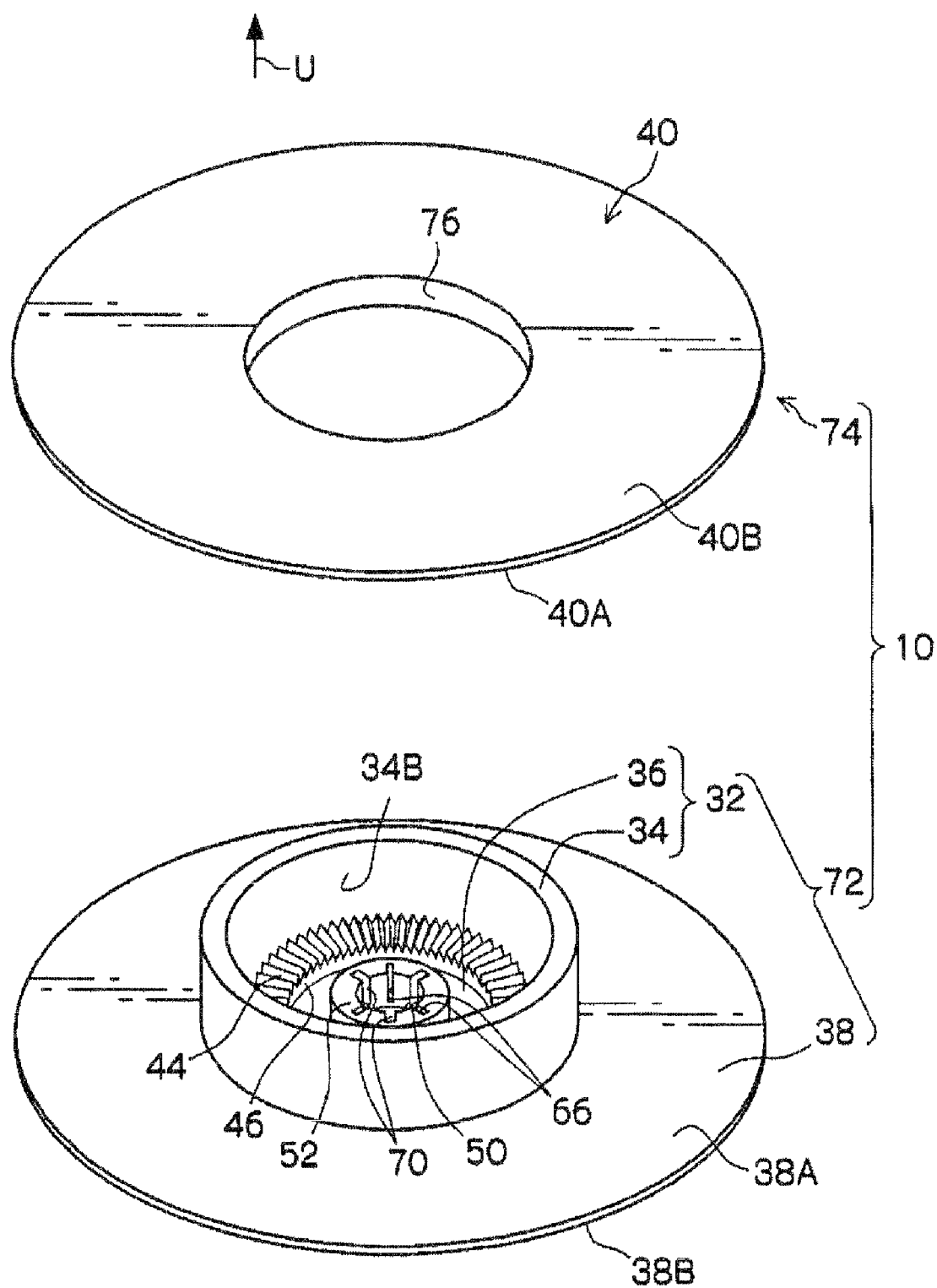
FIG. 4 is an exploded perspective view of the tape reel assembly.
Figure 8:
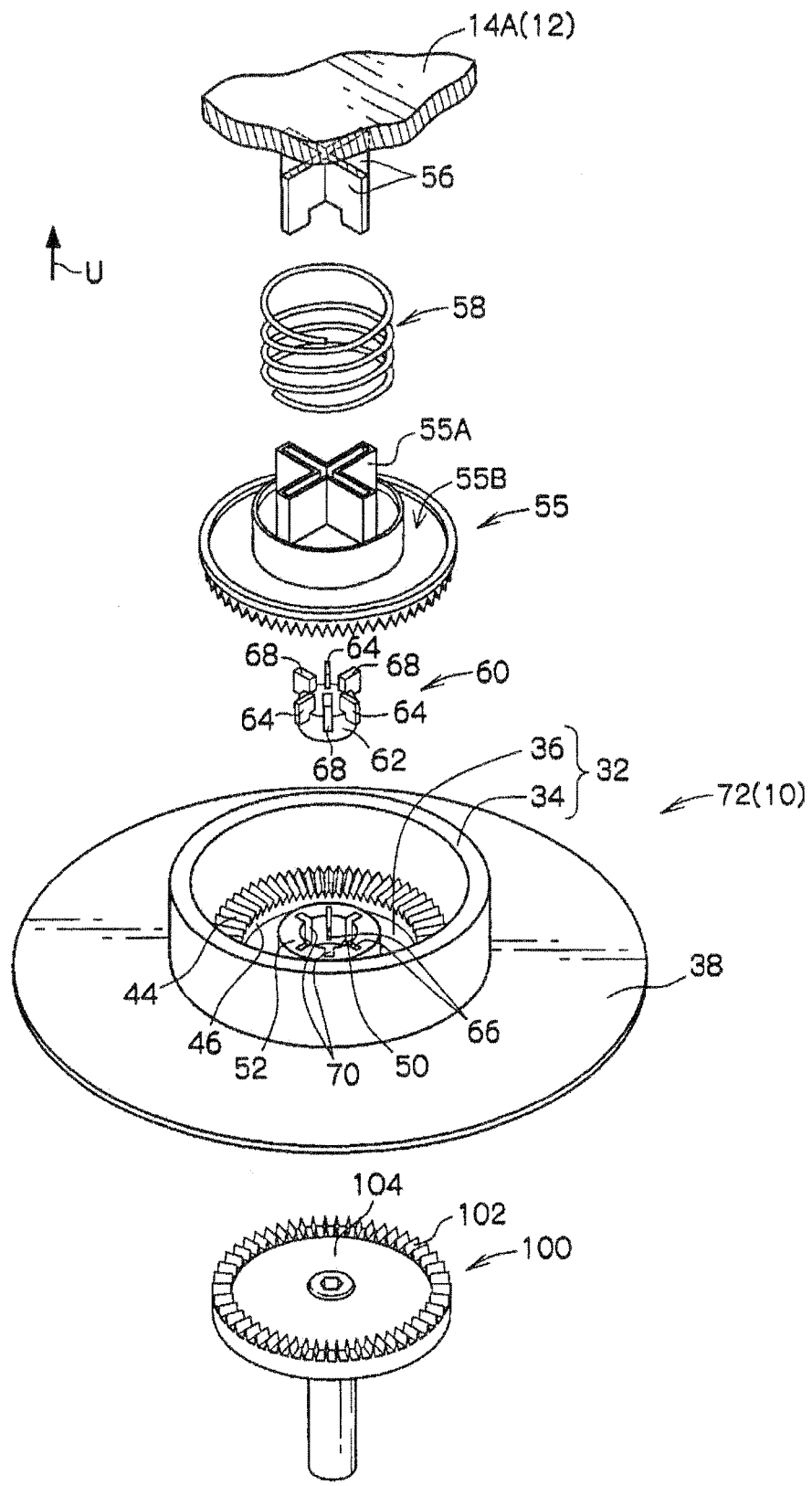
FIG. 8 is a perspective top view of a reel lock/unlock structure of the recording tape cartridge according to the present invention.

Referring to FIGS. 4 and 8 showing the tape reel assembly 10 built mainly of resin molding, the tape reel assembly 10 comprises opposing lower and upper flanges, namely a hub-attached lower flange 72 and a and a ribbed upper flange 74. More specifically, the tape reel assembly 10 includes opposing lower and upper flange sections 38 and 40, a hub body 32 and a reel plate 54 in the form of a circular metal plate. The lower and upper flange sections 38 and 40 are coaxially secured to, and extend radially outwardly from, opposite axial ends of the hub body 32. The hub body 32 is preferably comprised of a cylindrical hub ring section 34, an engagement section 36, and a reel gear 42 having toothless sections 42A at regular angular intervals where gear teeth are left uncut. The cylindrical hub ring section 34 forms a cylindrical tape-winding core closed at one end by the engagement section 36 and defines a central opening sized to receive the brake device 55 therein. The reel plate 54 made of a magnetic material has a center opening 54A and is coaxially secured to the hub body 32. The magnetic tape T is wound about the hub body 32, constrained laterally between and by opposing surfaces of the lower and upper flange sections 38 and 40.

Figure 6:
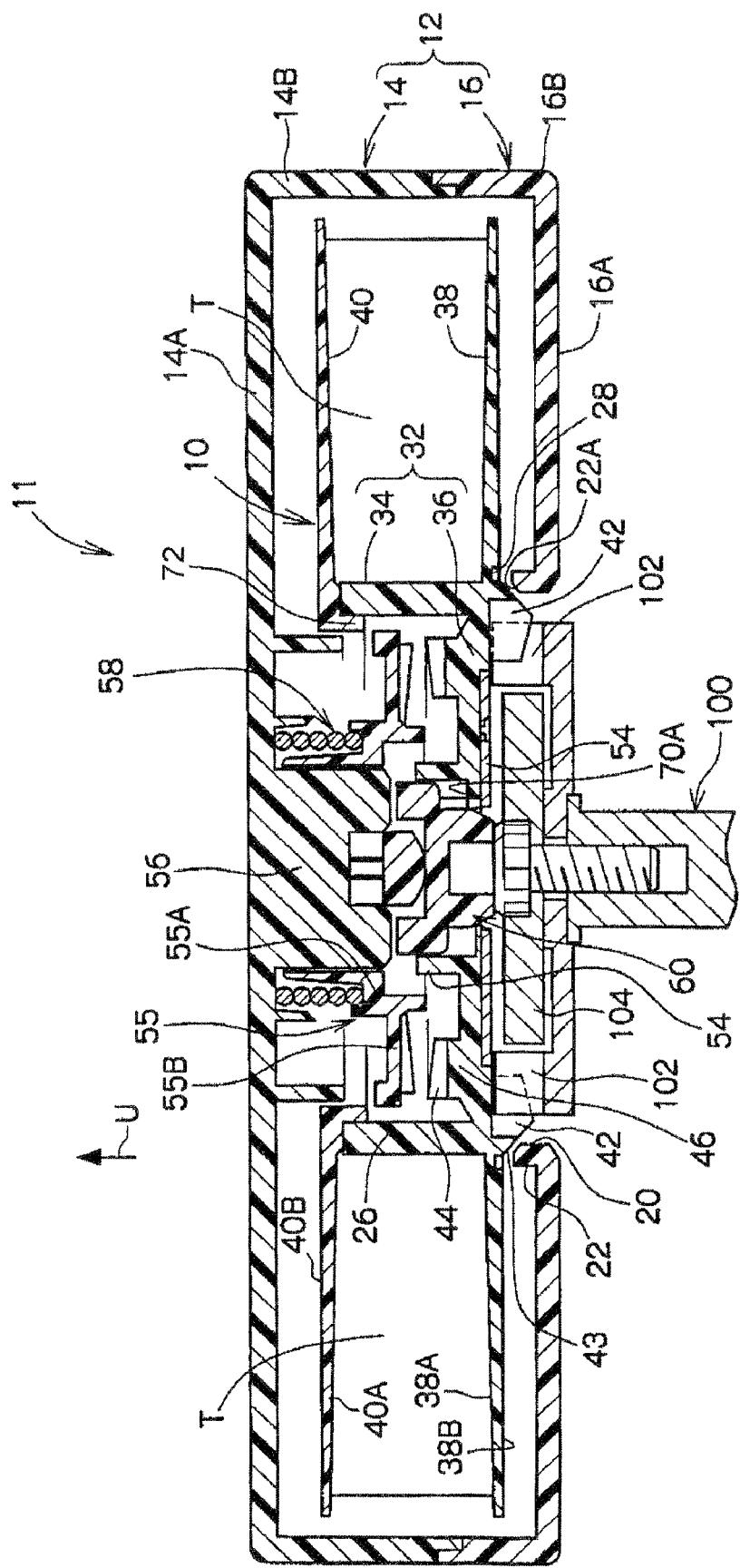
FIG. 6 is a cross sectional view of the recording tape cartridge in use.

As shown in detail in cross-sectional views of FIGS. 5 and 6, the engagement section 36 is comprised of a coupling gear 44 which is an annular bevel gear formed coaxially with, and extending inwardly from, an annular pedestal 46 formed at one end of the hub body 32. The coupling gear 44 is capable of engaging with a coupling gear 55B of the brake device 55. The engagement section 36 has a center bore 50 passing through or defined by a cylindrical clutch boss 52 shaped to receive a clutch device 60 associated with the brake device 55. The clutch boss 52 is cylindrical and extends inwardly along the center bore 50. The reel gear 42 is an annular gear formed coaxially with, and extending outwardly from, the hub body 32 and is capable of engaging with a drive gear 102 secured to the drive chuck 100 of the tape drive unit. The reel plate 54 is coaxially secured to the hub body 32 within the reel gear 42, for example by insertion molding or riveting and is attracted and held by a circular magnet plate 104 secured to the drive chuck 100 of the tape drive unit.

The brake device 55 is well known in the art and comprised of a biasing spring 58 and a brake device 55. The biasing spring 58 is preferably a coil spring formed to bias the brake device 55 within the opening defined by the cylindrical hub ring section 34 of the tape reel assembly 10. In this regard, the brake device 55 includes a cross recessed coupling joint 55A and an annularly-shaped toothed plate 55B. The cross-recessed coupling joint 55A is shaped to slidably receive a cross rib 56 extending from the top wall section 14A of the top mating shell half 14 so as thereby to prevent relative rotation of the tape reel assembly 10 to the cartridge casing 12 in a "locked" position. On the other hand, the annularly-shaped toothed plate 55B is shaped to engage the coupling gear 44 of the engagement section 36 of the hub body 32 of the tape reel assembly 10 in the "locked" position.

The clutch device 60 is disposed between the engagement section 36 and the brake device 55. More specifically, the clutch device 60 is comprised of a cylindrical body portion 62 and guide ribs 64 and stopper ribs 68 in alternately arranged at regular angular intervals around, and extending radially outwardly from, the body portion 62. The cylindrical clutch boss 52 is shaped to sidably receive the cylindrical body portion 62. That is, the clutch boss 52 is provided with radial grooves, namely antirotation grooves 66 and positioning grooves 70, having shoulders 70A (see FIG. 6), alternatively arranged at regular angular intervals. The guide ribs 64 are axially slidably received in the antirotation grooves 66 formed in the clutch boss 52 of the engagement section 36 to prevent the clutch device 60 from rotating relatively to the tape reel assembly 10. The stopper ribs 68 are axially slidably received in the positioning grooves 70 formed in the clutch boss 52 of the engagement section 36 and abuts against the shoulders 70A to put the clutch body in a given axial position with respect to the tape reel assembly 10.

Figure 7A:
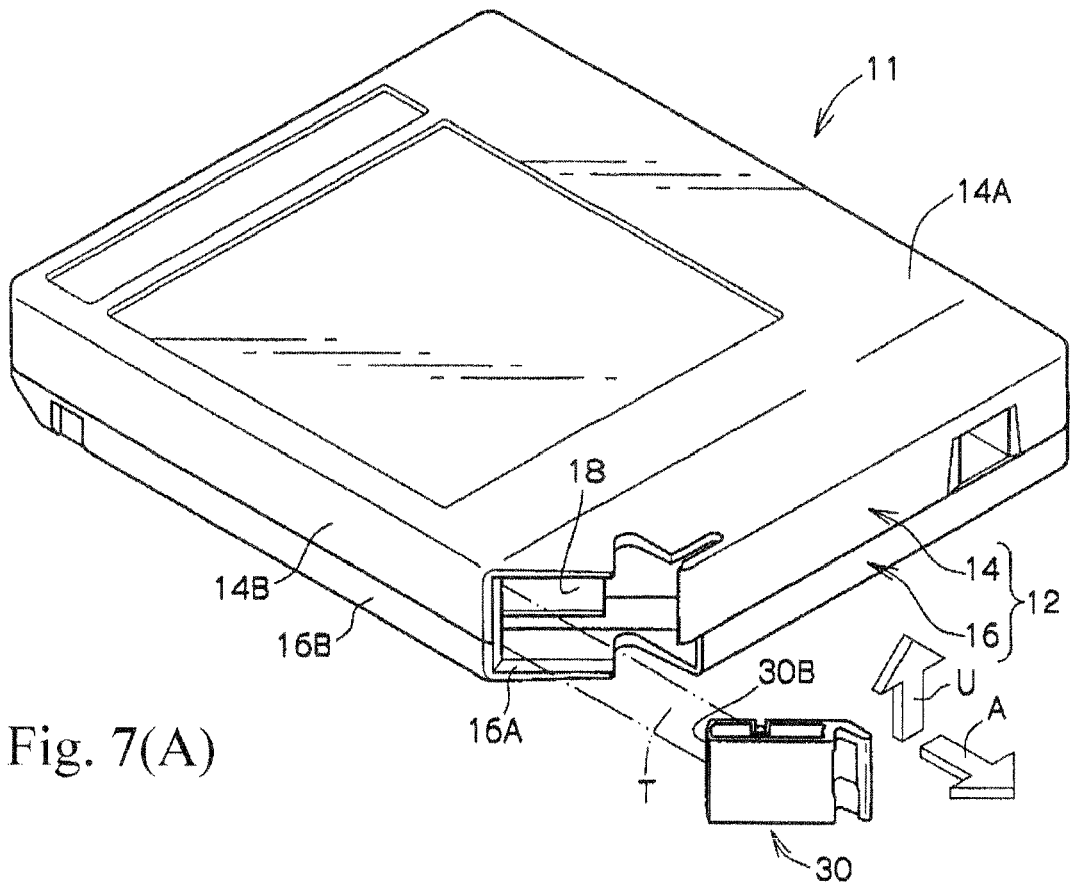
FIG. 7(A) is a perspective top view of the recording tape cartridge.
Figure 7B:
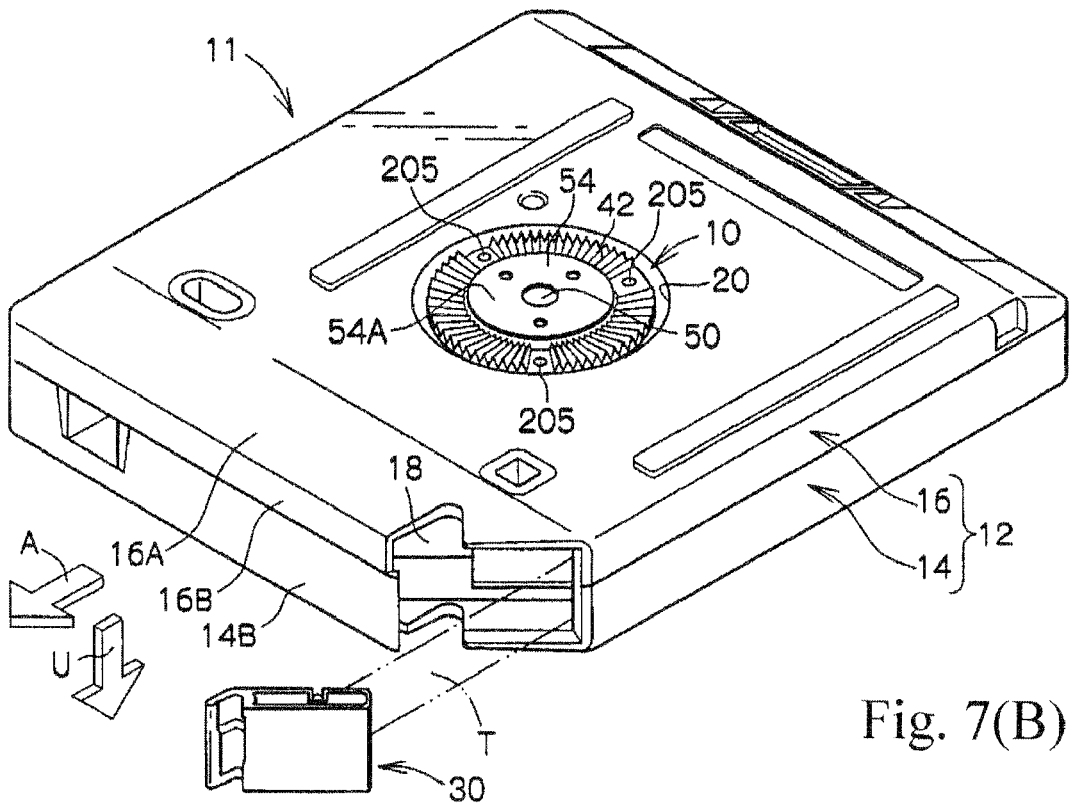
FIG. 7(B) is a perspective bottom view of the recording tape cartridge.

The tape reel assembly 10 is mounted on the annular rib 22 of the bottom wall section 16A in the cartridge casing 12. More specifically, the reel gear 42 of the tape reel assembly 10 has a tapered portion 43 radially outwardly continued therefrom. The tapered portion 43 is shaped to abut against the inwardly tapered top edge portion of the annular rib 22 of the bottom wall section 16A at the outermost portion thereof so as thereby to prevent the tape reel assembly 10 from changing in radial position. In this state, the tape reel assembly 10 is positioned to put the reel gear 42 and the reel plate 54 within the center opening 20 for access by the drive chuck 100 of the tape drive unit. That is, as shown in FIG. 7B, the reel gear 42 remains inside the cartridge casing 12. Further, the center bore 50 of the cylindrical clutch boss 52 exposes the outside of the cartridge casing 12 through the center opening 54A of the reel plate 54.

By means of this configuration of the recording tape cartridge 11, the brake device 55 is axially movable in two directions, namely upwardly and downwardly, to put the tape reel assembly 10 selectively in the "locked" and the "unlocked" position. That is, while the recording tape cartridge 11 is not used, the clutch device 60 is biased by the biasing spring 58 through the brake device 55 to bring the coupling gear 55B of the brake device 55 into engagement with the coupling gear 44 of the engagement section 36 in the "locked position" as shown in FIG. 5. As a result, the tape reel assembly 10 is prevented from rotating relatively to the cartridge casing 12. On the other hand, when the recording tape cartridge 11 is loaded into the drive unit, the clutch device 60 is pushed axially upwardly against the biasing spring 58 by the drive chuck 100 of the tape drive unit to disengage the clutch device 60 from the clutch boss 52 to disengage coupling gear 55B of the brake device 55 from the coupling gear 44 of the engagement section 36 in the "unlock" position as shown in FIG. 56. As a result, the tape reel assembly 10 is permitted to rotate relatively to the cartridge casing 12.

Describing about the tape reel assembly 10 in detail with reference to FIG. 4, the tape reel assembly 10 has a two-piece configuration comprising the hub-attached lower flange 72 which is formed as an integral piece of the lower flange section 38 and the hub ring section 34 and the ribbed upper flange 74 which is formed as an integral piece of the upper flange section 38 and an annular rib 76 configured to be fixedly coupled to the cylindrical hub ring section 34. The hub-attached lower flange 72 is an injection mold of a resin. As was described previously, the reel plate 54 is laid in the hub body 32 by insertion molding. The ribbed upper flange 74 is coaxially secured to the hub-attached lower flange 72, for example by ultrasonic welding the annular rib 76 to the cylindrical hub ring section 34.

As shown in FIGS. 5 and 6, the tape reel assembly 10 is shaped to have a face-to-face axial distance between the opposing lower and upper flange sections 38 and 40 which linearly increases from an inner side to an outer side in a radial direction. In this instance, the face-to-face axial distance is specifically defined as a face-to-face dimension between tapered inside surfaces 38A and 40A of the lower and upper flange sections 38 and 40. In more detail, the lower flange section 38 has an axial thickness gradually decreasing from the inner side to the outer side in the radial direction between an outside surface 38B perpendicularly extending from the cylindrical hub ring section 34 of the hub body 32 and an tapered inside surface 38A extending at an angle $\theta_{38A}$ of, for example, 0.5 degrees, as a normal design angle, with the outside surface 38B. Similarly, the upper flange section 40 has an axial thickness gradually decreasing from the inner side to the outer side in the radial direction between an outside surface 40B perpendicularly extending from the cylindrical hub ring section 34 of the hub body 32 and an tapered inside surface 40A extending at an angle $\theta_{40A}$, for example, 0.5 degrees (normal design angle) with the outside surface 40B. Thus, the tape reel assembly 10 is provided with a tapered space between the opposing lower and upper flange sections 38 and 40. The taper angle of the inside surface of the flange is set so as to prevent the lower and/or upper flange sections 38 and 40 from being brought into contact with the magnetic tape T due to distortion of the cylindrical hub ring section 34 of the hub body 32 such as caused resulting from surface vibrations of the lower and upper flange sections 38 and 40 and/or take-up pressure of the magnetic tape T. In this instance, the taper angle $\theta_{38A}$ and $\theta_{40A}$ are preferably set in a range of from 0.3 to 0.7 degrees. When making the tape reel assembly 10 described above, the hub-attached lower flange 72 and the ribbed upper flange 74 are separately formed by resin injection molding.

Figure 2:
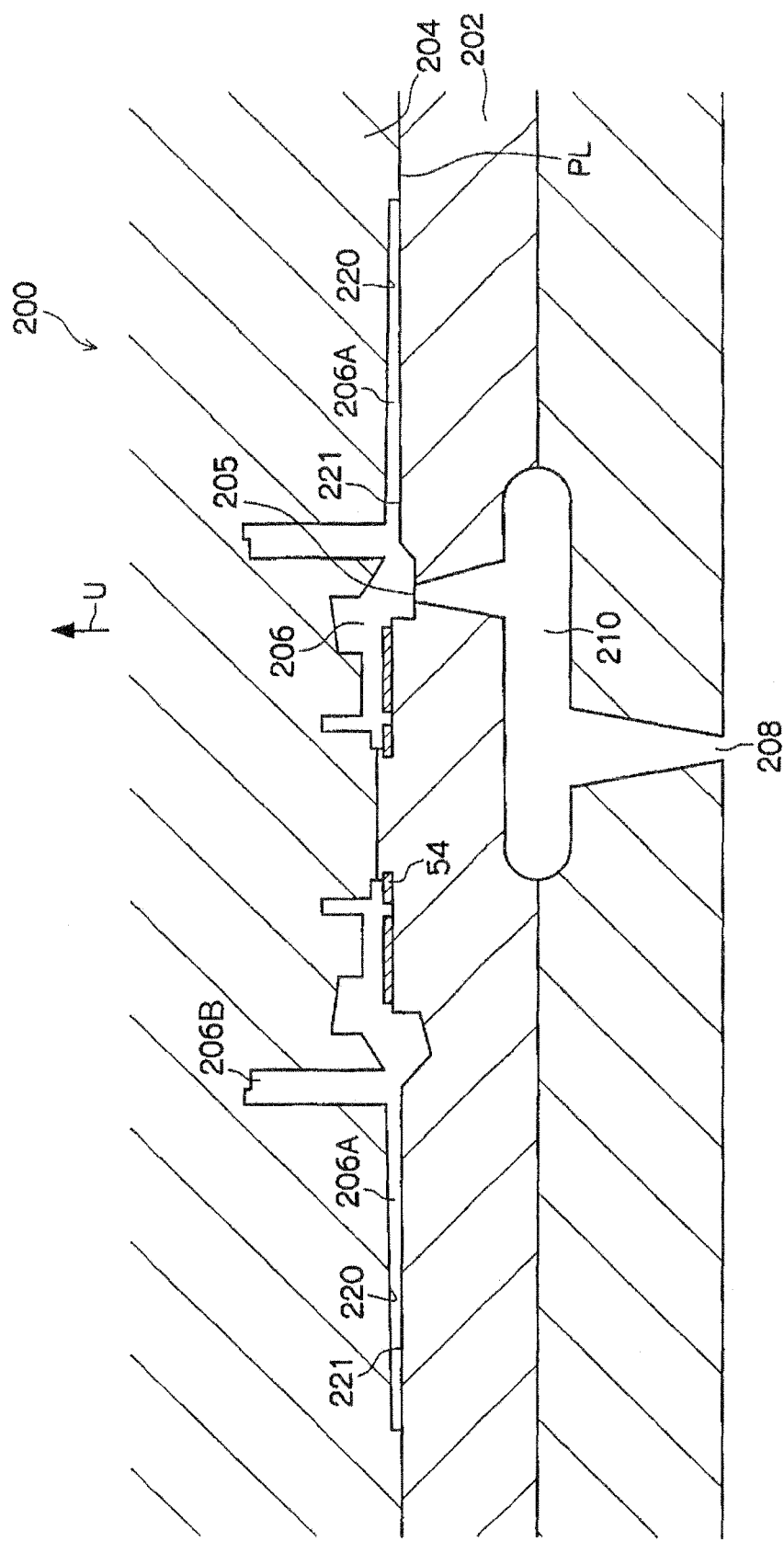
FIG. 2 is an overall cross-sectional view of the metal mold of the of the mold assembly.

Referring to FIG. 2 showing a mold assembly 200 for injection molding the hub-attached lower flange 72, the mold assembly 200 comprises a lower stationary metal mold 202 and a movable upper metal mold 204 for forming a mold cavity 206 therebetween into which a resin material is injected. The mold cavity 206 comprises a flange-molding cavity section 206A for the lower flange section 34 and a hub-molding cavity section 206B for the hub body 32. Specifically, the movable upper metal mold 204 has a mold surface 220 which borders the flange-molding cavity section 206A so as to form the tapered inside surface 38A of the lower flange section 38. On the other hand, the stationary lower mold 202 has a mold surface 221 which borders the flange-molding cavity section 206A so as to form the outside surface 38B of the lower flange section 38. Further, the stationary lower mold 202 has a plurality of, specifically three in this embodiment, injection gates 205 arranged at regular angular intervals through which a resin material is injected into the mold cavity 206. The injection gates 205 are located correspondingly to the toothless sections 42A of the reel gear 42.

When casting the hub-attached lower flange 72 using the mold assembly 200, after presetting the reel plate 54 in position in the mold cavity 206 of the mold assembly 200, a resin material is injected into the mold cavity 206 of the mold assembly 200 from an injection molding machine (not shown) through the gates 205 via a sprue 208 and runner channels 210 formed in the stationary mold 202. When the resin material is cooled and solidified in the mold cavity 206 of the mold assembly 200, the mold assembly 200 is opened along the parting line PL to permit a hub-attached lower flange 72 with a reel plate 54 pre-inserted to be removed therefrom.

Figure 3:
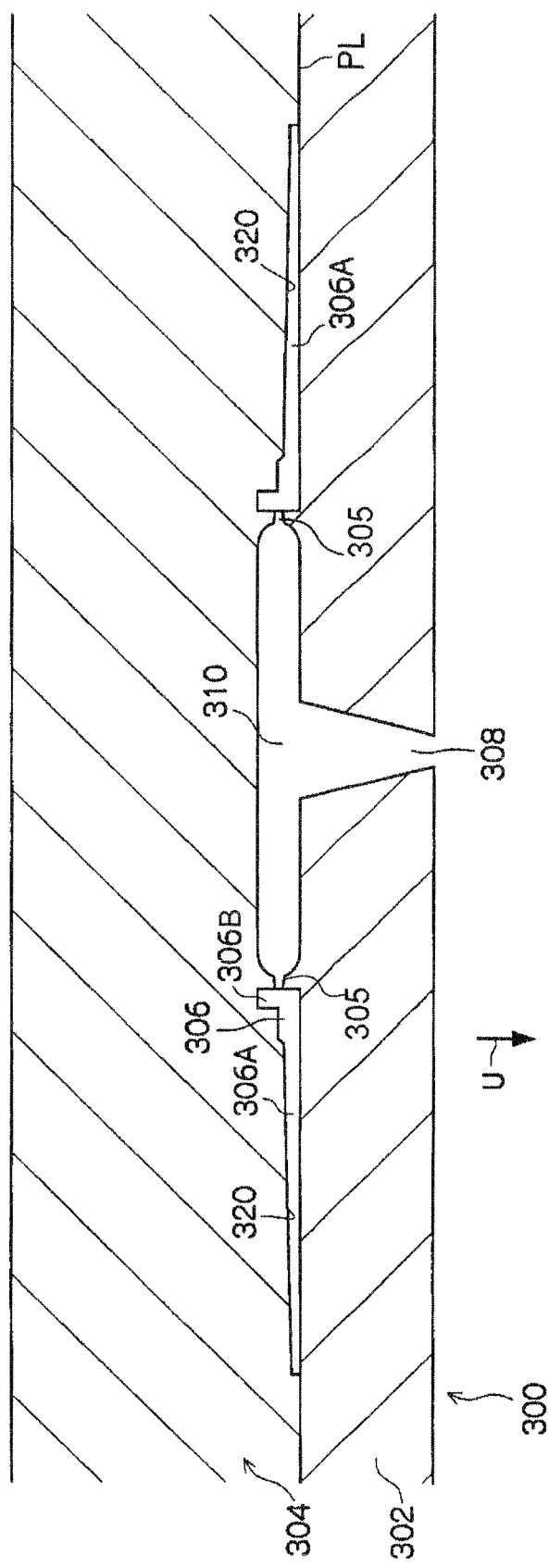
FIG. 3 is an overall cross-sectional view of a metal mold forming a part of the mold assembly for molding another tapered flange of the tape reel assembly.

Referring to FIG. 3 showing a mold assembly 300 for injection molding the ribbed upper flange 74, the mold assembly 300 comprises a lower stationary metal mold 302 and a movable upper metal mold 304 for forming a mold cavity 306 therebetween into which a resin material is injected. The mold cavity 306 comprises a flange mold cavity section 306A for the upper flange section 38 and a rib-molding cavity section 306B for the rib annular rib 76. The mold assembly 300 has a plurality of, specifically six in this embodiment, injection gates 305 arranged at regular angular intervals between the lower stationary mold 302 and a movable upper metal mold 304 so as to open radially to the rib-molding cavity section 306B. The movable metal mold 304 has a mold surface 320 which borders the flange-molding cavity section 306A so as to form the tapered inside surface 40A of the upper flange section 40. When casting the ribbed upper flange 74 using the mold assembly 300, a resin material is injected into the mold cavity 306 of the mold assembly 300 from an injection molding machine (not shown) through the gates 305 via a sprue 308 and runner channels 310 formed in the stationary metal mold 302. When the resin material is cooled and solidified in the mold cavity 306 of the mold assembly 300, the mold assembly 300 is opened along the parting line PL to permit a ribbed upper flange 74 to be removed therefrom.

The reel assembly 10 is completed by fitting the annular rib 76 of the upper flange 74 in the cylindrical hub ring section 34 of the hub-attached lower flange 72 and securing the upper flange 74 to the top of the cylindrical hub ring section 34 of the hub-attached lower flange 72.

Greater details of the mold surface 220 of the mold assembly 200 are described below with reference to FIG. 1. Since the mold surfaces 220 and 320 are basically similar in structure to each other, the following description is directed to the mold surface 220 of the mold assembly 200 and applied to the mold surface 320 of the mold assembly 300 by appending parenthetical references to similar parts. FIG. 1 is a schematic sectional view partially showing the mold assembly 200 with the flange-molding cavity section 206A exaggerated in dimensions in thickness direction. As shown, the flange-molding cavity section 206A reduces its depth D radially outwardly from the center thereof correspondingly to the lower flange section 38 of the hub-attached lower flange 72 having a thickness decreasing from an inner side to an outer side in a radial direction. Specifically in this embodiment, the flange-molding cavity section 206A is shaped to have a depth Di of approximately 1.25 mm at an inner periphery in a radial direction and a depth Do of approximately 1.09 mm at an outer periphery in a radial direction. The mold surface 220 is shaped convexly to the opposite surface, namely the mold surface 221 of the lower stationary metal mold 202 bordering the flange-molding cavity section 206A. In other words, the mold surface 220 is shaped convexly to the flange-molding cavity section 206A or boarders a concave mold cavity, differently from a straight planer surface 502 (shown by a hypothetical line in FIG. 1) which boarders a flange-molding cavity section 504 of a prior art mold assembly 500 for a lower flange section with a straight tapered inside surface as a comparative example shown in FIG. 13. Seeing the lower flange section 38 from a different aspect, the inside surface 38A of the lower flange section 38 is shaped concavely.

More specifically, the mold surface 220 is a composite surface comprising a plurality of, e.g. three in this embodiment, surface sections, flat and ring-shaped as viewed in an axial direction, namely an inner peripheral surface section 220A at a taper angle θa with the mold surface 221 of the lower stationary mold 202 or the parting line of the mold assembly 200, an intermediate surface section 220B at a taper angle θb with the mold surface 221 of the lower stationary metal mold 202 or the parting line of the mold assembly 200 and an outer peripheral surface section 220C at a taper angle θc with the mold surface 221 of the lower stationary metal mold 202 or the parting line of the mold assembly 200 (θa>θb>θc). Each adjacent surface sections are partitioned by a circular boundary 222 or 224 like a circular seam line. It is preferred that the largest taper angle θa is numerically larger higher than intended or normal design angle $θ_{38A}$ of the lower flange section 38 and, on the other hand, the smallest taper angle θc is lower than the normal design angle $θ_{38A}$ of the lower flange section 38. For example, in this embodiment, the taper angles θa, θb and θc are in a range of from 0.6 to 0.8 degrees, in a range of from 0.3 to 0.5 degrees, and in a range of from 0 to 0.2 degrees, respectively. Specifically, the mold surface 220 of the upper metal mold 204 is sectionalized into the three annular surface sections 220A, 220B and 220C by the circular boundary 222 having a radius r1 of 33 mm and the circular boundary 224 having a radius r2 of 36 mm for a hub-attached lower flange 72 with a hub body 32 having an outside diameter of approximately 44 mm and a lower flange section 34 having an outside diameter of approximately 96 mm. The mold assembly 200 is used to cast the hub-attached lower flange 72 with the lower flange section 34 having the tapered inside surfaces 38A by resin injection molding.

The mold surface 320 of the mold assembly 300 for the ribbed upper flange 74 is shaped similarly to the mold surface 220 of the mold assembly 200 for the hub-attached lower flange 72 except for differences in detailed dimensions of the upper flange section 38 from the lower flange section 38.

When the recording tape cartridge 11 is unused as shown in FIG. 5, the brake device 55 is forced by the biasing spring 58 to bring the coupling gear 55B into engagement with the coupling gear 44 of the engagement section 36 of the hub body 32 so as thereby to prevent the tape reel assembly 10 from rotating relatively to the cartridge casing 12. In this locked position, the reel gear 42 is positioned face to face with the center opening 20 of the cartridge casing 12. Concurrently, the clutch device 60 is positioned with the cylindrical body portion 62 remaining in the center bore 50 of the engagement section 36 and exposing the outside of the cartridge casing 12 through the center opening 20 of the cartridge casing 12.

On the other hand, when the recording tape cartridge 11 is loaded into the drive unit along the arrow A and properly set it in a bucket (not shown) of the drive unit, the bucket comes down to bring the drive chuck 100 relatively upward toward the center opening 20 of the cartridge casing 12. When the bucket fully comes down, the drive chuck 100 brings the magnet plate 104 into attraction to the reel plate 54 of the tape reel assembly 10 and retains the tape reel assembly 10 with the drive gear 102 engaged with the reel gear 42. As the drive chuck 100 relatively moves toward the cartridge casing 12 in the axial direction until engagement between the drive gear 102 and the reel gear 42 is provided, the drive chuck 100 abuts against the cylindrical body portion 62 of the clutch device 60 and then pushes the clutch device 60 upward against the biasing spring 58. As a result the coupling gear 55B of the brake device 55 is disengaged from the coupling gear 44 of the engagement section 36 of the hub body 32. That is, the brake device 55 is brought into a position where the brake device 55 is permitted to rotate relatively to the tape reel assembly 10. When the drive chuck 100 further moves upward, the tape reel assembly 10 is shifted upward against the biasing spring 58 with the clutch device 60 and the brake device 55 (without hanging a relative position to the clutch device 60 and the brake device 55). Consequently, the brake device 55 reaches into a position it is permitted to rotate relatively to the cartridge casing 12 without fail in concurrence with separation of the lower flange section 38 of the tape reel assembly 10 from the annular rib 22 of the cartridge casing 12. Accordingly, the tape reel assembly 10 is spaced from the cartridge casing 12, so as thereby to be enabled to rotate out of contact with the interior surface of the cartridge casing 12.

Although simplifying an explanation, due to downward moving of the bucket of the drive unit in which the recording tape cartridge 11 is loaded in a stationary state, the recording tape cartridge 11 is positioned in horizontal and vertical directions with respect to the drive unit as shown in FIG. 6. Then, lead-out means (not shown) of the drive unit catches and pulls out the leader block 30 from the recording tape cartridge 11 and leads it to the take-up reel of the drive unit. The leader block 30 is then fit and coupled to and integrated with a reel hub of the take-up reel so as to form a part of the winding surface of the reel hub for the magnetic tape T. In this state, when the reel tape with the leader block 30 coupled together rotates, the magnetic tape T is pulled out of the cartridge casing 12 trough the tape egress/ingress opening 18 and wound around the reel tape. At this time, the tape reel assembly 10 of the recording tape cartridge 11 is rotated in synchronism with the take-up reel by rotational force of the drive chuck 100 which is transmitted to the reel gear 42 from the drive gear 102. While the magnetic tape T is pulled out of the cartridge casing 12, a read-write head arranged along a predetermined tape path in the drive unit records information on the magnetic tape T or reproduces information recorded on the magnetic tape T. In this instance, the brake device 55, which is unable to rotate relatively to the cartridge casing 12, is in slide contact with the clutch device 60 which rotates relatively to the cartridge casing 12 as well as the tape reel assembly 10.

On the other hand, when the magnet tape T is rewound around the tape reel assembly 10 and the leader block 30 attached to the free-end is placed in close vicinity to the tape egress/ingress opening 18, the bucket with the recording tape cartridge 11 set therein is shifted upward, so that, while the reel gear 42 is disengaged from the drive gear 102, the clutch device 60 detaches from the drive chuck 100. Consequently, the brake device 55 and the clutch device 60 are jointly moved downward by the biasing spring 58. In moving so, the clutch device 60 bring the stopper ribs 68 into abutment against the shoulders 70A of the positioning grooves 70 of the clutch boss 52 and, on the other hand, the coupling gear 55B of the brake device 55 is brought into engagement with the coupling gear 44 of the engagement section 36 of the hub body 32. That is, the brake device 55 returns to the locked position in which it prevents the tape reel assembly 10 from turning relatively to the cartridge casing 12. Simultaneously with the downward movement of the brake device 55 and the clutch device 60, the reel assembly 10 moves downward so as thereby to return to an initial position in which the lower flange section 38 is in abutment with the annular rib 22 of the cartridge casing 12 and the reel gear 42 is positioned face to face with the center opening 20 of the cartridge casing 12. In this state, the recording tape cartridge 11 is ejected from the bucket.

The tape reel assembly 10 of the recording tape cartridge 11 just described above is made up of the hub-attached lower flange 72 and the ribbed upper flange 74 formed by resin injection molding through the use of the molding assemblies 200 and 300, respectively. In this instance, as the mold assembly 200 for forming the hub-attached lower flange 72 having the lower flange section 38 is shaped to have the mold surface 220 shaped convexly to the flange-molding cavity section 206A, the tapered inside surface 38A of the lower flange section 38 formed by the use of the mold assemblies 200 is formed in high surface accuracy.

Figure 9A:
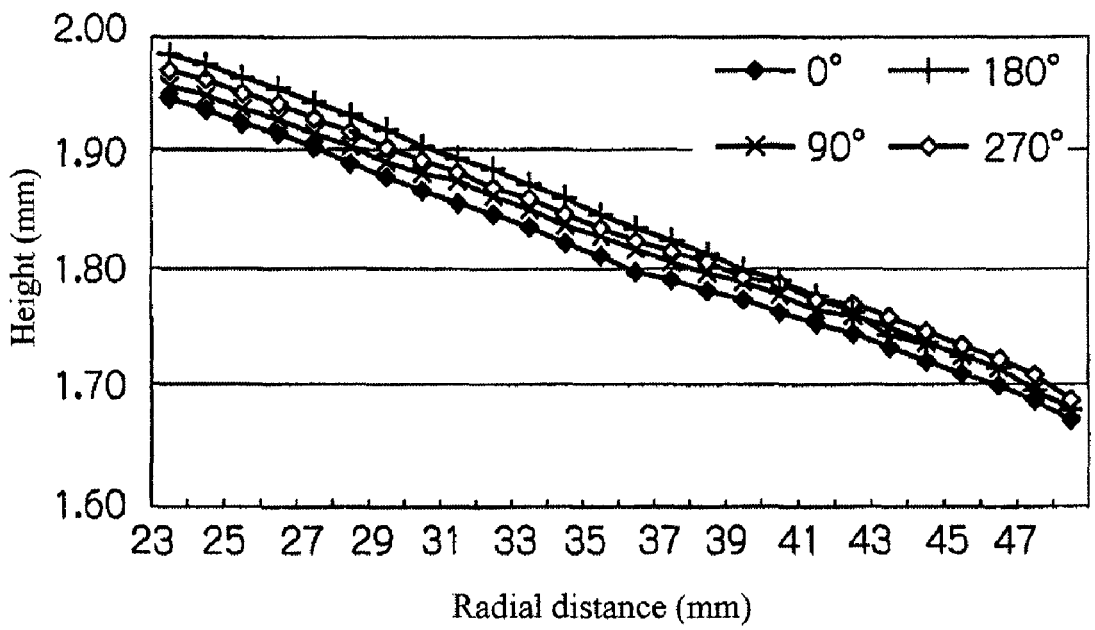
FIG. 9(A) is a graphic chart representing a geometric surface configuration of a flange molded by the mold assembly of the present invention.
Figure 9B:
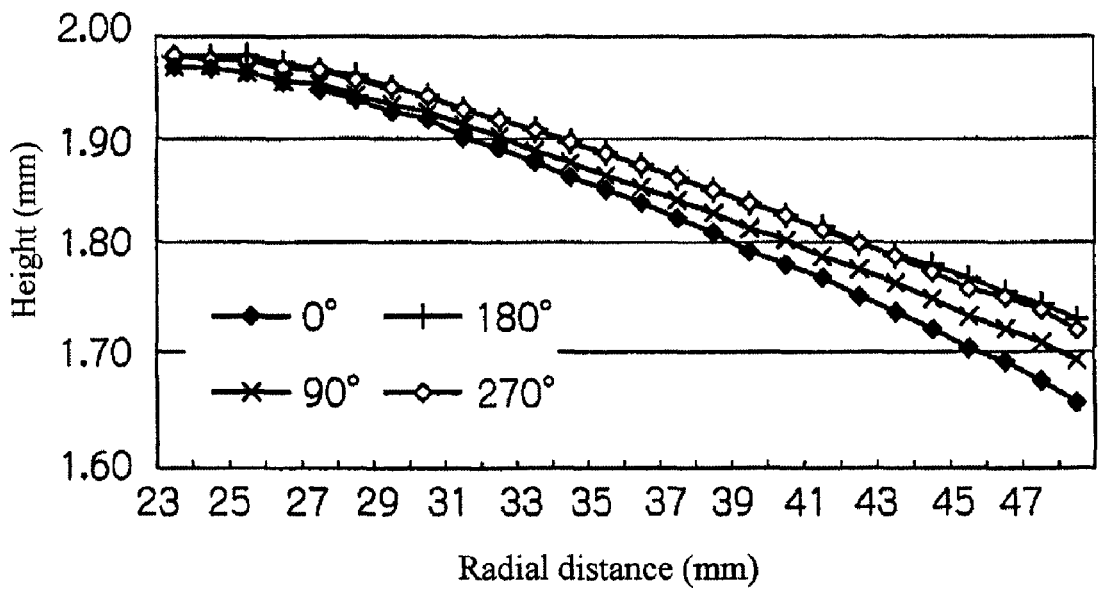
FIG. 9(B) is a graphic chart representing a geometric surface configuration of a comparative flange molded by prior art.
Figure 13:
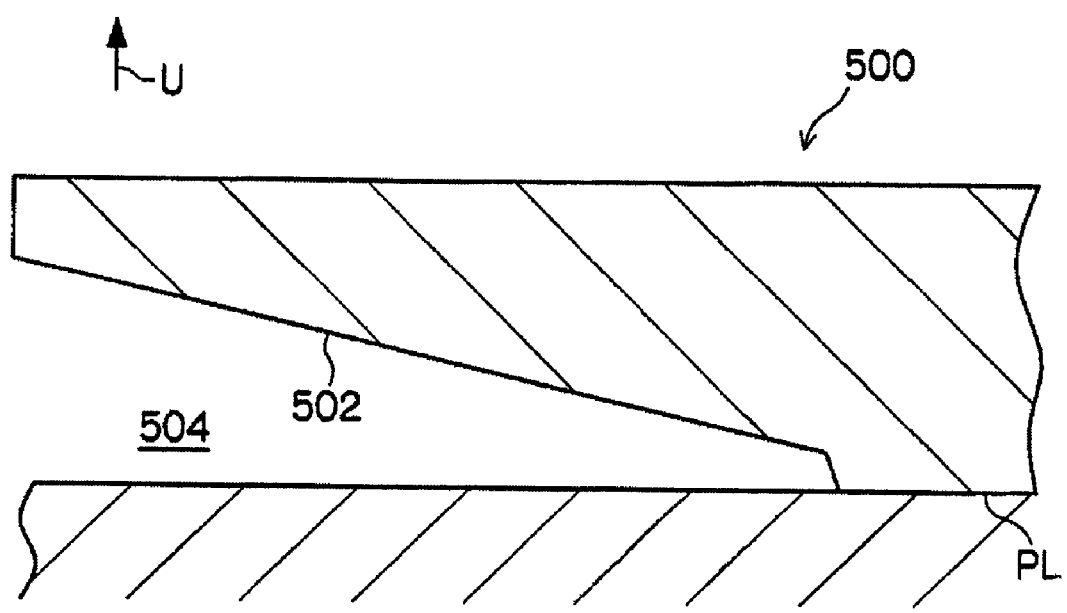
FIG. 13 is a schematic view of an essential part of a metal mold forming a part of a prior art mold assembly for molding the comparative tapered flange represented in FIG. 9(B).

FIG. 9(A) is a graphic representation of the tapered inside surface 38A of the lower flange section 38 of the tape reel assembly 10 by height measured from a given base level at different radial distances, more specifically, at intervals of 1 mm, in different circumferential positions (0°, 90°, 1800° and 270°) of the lower flange section 38. FIG. 9(B) is similar to that shown in FIG. 9(A) and representing a tapered inside surface of a lower flange section which was formed as a comparative product by the use of a prior art mold assembly 500 having a flat mold surface 502 such as shown in FIG. 13. It is to be noted that the height of the tapered inside surface of the comparative lower flange section is not always identical with thickness of the flange section according to where the given base level lies. As found from comparison between FIGS. 9(A) and 9(B), the tapered inside surface 38A of the lower flange section 38 has smaller variations in height or taper angle at the radial distances than that of the comparative lower flange section. In other words, a generatrix of a radial cross-section of the tapered inside surface 38A of the lower flange section 38 has a higher linearity than that of the comparative lower flange section. Further, it is also found that the tapered inside surface 38A of the lower flange section 38 has smaller variations in height or taper angle in the circumferential positions than that of the comparative lower flange section. Concerning the tape reel assembly 10 of the instant embodiment, it has been ascertained from actual measurement that differences of height $\Delta H$, which is a difference between measured heights H at adjacent radial points of measurement, fall within specified limits of admissible error C ($0 < \Delta H < C$).

As just described above, it is realized to form the lower flange section 38 having the inside surface 38A, an excellent tapered surface, by resin injection molding through the use of the mold assembly 200 having the convex mold surface 220. Providing an additional description of flange production mechanism, by in resin injection molding by the use of the mold assembly 500 shown in FIG. 13 for molding the comparative lower flange section, the tapered inside surface has a taper angle made smaller at a circumbasal portion of the comparative lower flange section than a taper angle of the mold surface 502 of the mold assembly 500 and made larger at a peripheral portion than the taper angle of the mold surface 502 of the mold assembly 500. This is because the inflow resin material is relatively high in kinetic pressure at the peripheral portion and, on the other hand, relatively low in kinetic pressure at the circumbasal portion of the comparative lower flange section owing to a flow rate distribution and a pressure distribution of the inflow resin material. The diagram of the measured height of the tapered inside surface of the comparative lower flange section shown in FIG. 9(B) represents a configuration of the comparative lower flange section that includes a raised surface at a radially middle portion thereof Further, the mold assembly 500 is apt to cause the inflow resin material to vary in kinetic pressure and flow rate at a peripheral location which the inflow resin material reaches. In consequence, the comparative lower flange section is easy to have irregularities in thickness at a peripheral edge portion thereof. Variations in measured height at a peripheral edge of the comparative lower flange section shown in FIG. 9(B) represent the thickness irregularities. By contrast, according to resin injection molding by the use of the mold assembly 200 specifically shown in FIG. 1 for molding the tape reel assembly 10 of the present invention, since the mold surface 220 of the mold assembly 200 which borders the flange-molding cavity section 206A is comprised of at least the inner peripheral surface section 220A which receives relatively high kinetic pressure of the inflow resin material and has a larger taper angle than a given taper angle of the lower flange section 38 and the outer peripheral surface section 220C which receives relatively low kinetic pressure of the inflow resin material and has a smaller taper angle than the given taper angle, the tapered inside surface 38A of the molded lower flange section 38 is made up of uniformly tapered surface sections, in other words, has a continuous flat surface without variations in taper angle. Furthermore, since the mold surface 220 of the mold assembly 200 is gradually changed in taper angle from the inner peripheral surface section 220A to the outer peripheral surface section 220C, the inflow resin material is quite easily uniformized in pressure gradient (pressure distribution) in radial direction at every circumferential location, so that the lower flange section 38 has no surface shake at a peripheral edge portion thereof.

In addition, as was previously described, since the mold surface 220 of the mold assembly 200 is partitioned by the circular boundaries 222 and 224 so as to provide a convex configuration, it is enabled to facilitate control over the taper angle itself or accuracy of the taper angle of the tapered inside surface 38A of the molded lower flange section 38. The same applies to the tapered inside surface 40A of the molded upper flange section 40. That is, it is realized to adjust the taper angle itself or accuracy of the taper angle of the tapered inside surface 38A of the molded lower flange section 38 by radial locations of the circular boundaries 222 and 224 and/or individual taper angles of the surface sections 220A, 220B and 220C. For example, although the tapered inside surface of the comparative lower flange section formed by the use of the mold assembly 500 is convex upward as represented by the diagram shown in FIG. 9(B), the molded lower flange section 38, which is formed by the use o the mold assembly 200 having the surface sections 220A, 220B and 220C at different taper angles so as to provide a downward convex configuration, has the tapered inside surface 38A which is favorably flat without variations in taper angle. In particular, since the mold surface 220 of the mold assembly 200 is comprised of a plurality of, specifically at least three, surface sections tapered at different angles, it is enabled to realize precise control of the taper angle itself or accuracy of the taper angle of the tapered inside surface 38A of the molded lower flange section 38. Although no description of measured height of the tapered inside surface 40A of the upper flange section 40 of the tape reel assembly 10 is provided herein, it has been ensured that the above is fully true of the tapered inside surface 40A of the upper flange section 40 formed by the use of the mold assembly 300 having the mold surface 320 shown in parentheses in FIG. 1.

Due to high dimensional precision of the tapered inside surfaces 38A and 40A, the tape reel assembly 10 facilitates favorable winding of the magnetic tape T between the lower and upper flange sections 38 and 40 and is able to maintain the magnetic tape T wound around in a tidy state. In addition, the tape reel assembly 10 restrains or prevents the magnetic tape T from causing cross-direction interference with the tapered inside surfaces 38A and 40A arising from, for example, deformation of the hub ring section 34 of the hub body 32 and/or surface shake of the lower and upper flange sections 38 and 40. As a result, the recording tape cartridge 11 is able to provide stable travels of the magnetic tape T during writing information on or reading information from the magnetic tape T.

Referring to FIGS. 11(A) and 11(B) showing an alternative tape reel assembly 10A and its related parts of the recording tape cartridge 11 according to the embodiment of the present invention, the tape reel assembly 10A made up of a hub-attached lower flange 72A and a ribbed upper flange 74A is different from the tape reel assembly 10 according to the previous embodiment only in that hub-attached lower flange 72 is provided with an engagement section 36 formed with three through bores 82 arranged at regular angular intervals in place of the center bore 50 of the clutch boss 52 for receiving the clutch device 60 associated with the tape reel assembly 10. The individual through bore 82 is formed in a toothless section 42A of a reel gear 42 of a hub body 32 where an injection gates is located. The tape reel assembly 10A is accompanied by a release device 84 by which the tape reel assembly 10A is unlocked to rotate relatively to a cartridge casing 12. The release device 84 has a generally rectangular release pad 84A provided with legs 84B extending downward at corners thereof so as to be received in the bores 82 of the of the reel gear 42 of the hub body 32, respectively. In order to avoid interference of the release pad 84A with a coupling gear 44 of an engagement section 36, the coupling gear 44 is comprised of a plurality of, specifically three in this embodiment, segment gears projecting upward from a pedestal (the annular pedestal 46 as shown in FIG. 4).

Referring to FIGS. 12(A) and 12(B), the release device 84 is shifted upward relatively to a cartridge casing 12 so as thereby to bring the brake device 55 from a braking position to a non-braking position resulting from that the drive gear 102 of the drive chuck 100 presses up the legs 84B of the release pad 84A when brought into engagement with the reel gear 42.

Figure 10:
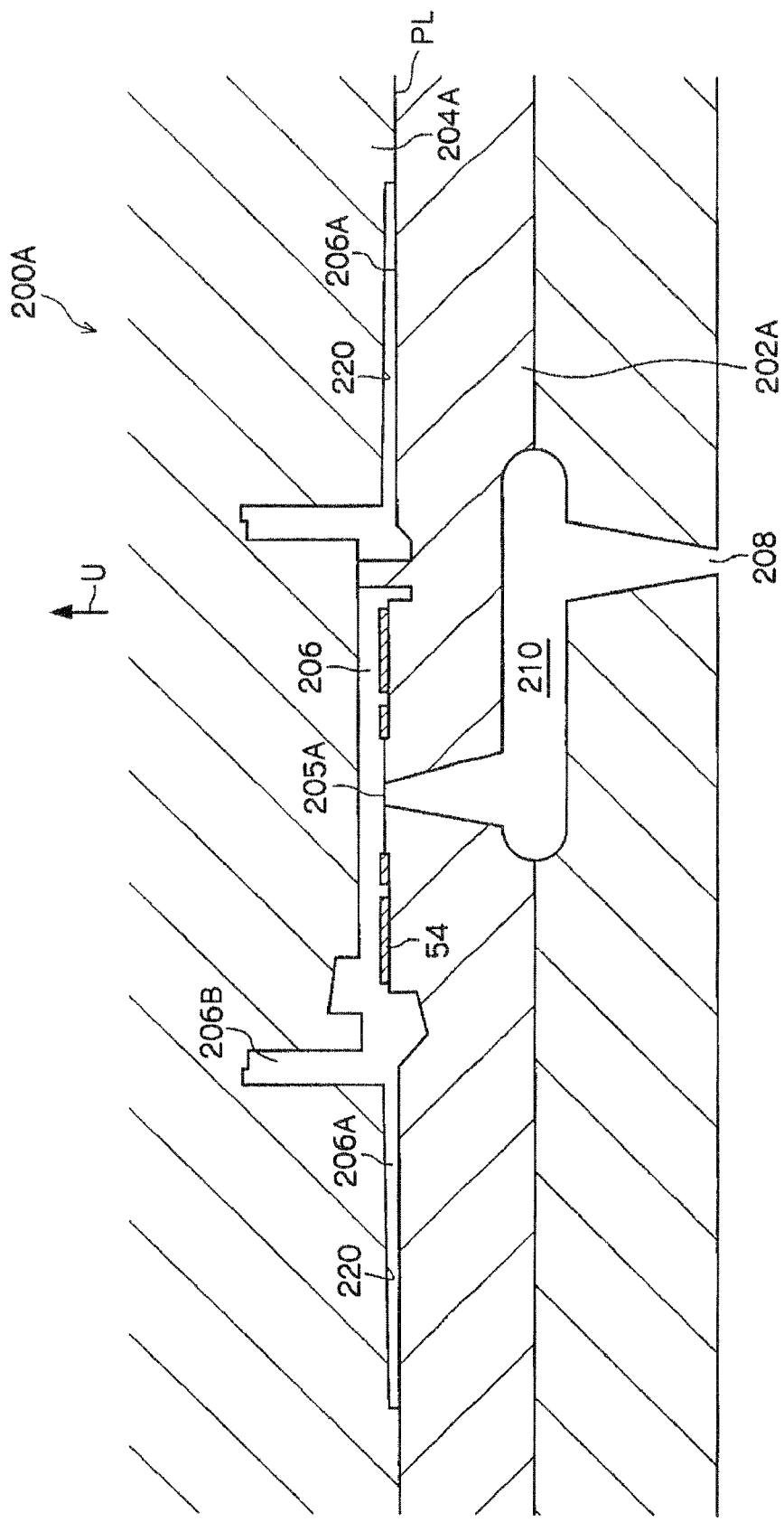
FIG. 10 is an overall cross-sectional view of a metal mold forming a part of a mold assembly for molding an alternative tapered flange of the tape reel assembly.

The hub-attached lower flange 72A forming a part of the tape reel assembly 10A is produced by the use of a mold assembly 200A shown in FIG. 10.

Referring to FIG. 10, the mold assembly 200A comprises a lower stationary metal mold 202A and a movable upper metal mold 204A for forming a mold cavity 206 therebetween into which a resin material is injected. The mold cavity 206 comprises a flange-molding cavity section 206A for the lower flange section 34 and a hub-molding cavity section 206B for the hub body 32. The stationary lower metal mold 202 has a single injection gate 205A through which a resin material is injected into the mold cavity 206. The injection gate 205A is located so as to open into a center opening 54A of a reel plate 54 forming a part of an engagement section 36 of a hub body 32 of the hub-attached lower flange 72A (see FIG. 11(B)).

When casting the hub-attached lower flange 72 using the mold assembly 200, a resin material is injected into the mold cavity 206 of the mold assembly 200A from an injection molding machine (not shown) through the gates 205A via a sprue 208 and runner channels 210 formed in the stationary metal mold 202A. When the resin material is cooled and solidified in the mold cavity 206 of the mold assembly 200A, the mold assembly 200A is opened along a parting line PL to permit a hub-attached lower flange 72A with the reel plate 54 pre-inserted to be removed therefrom. It is just like the movable upper metal mold 204 that the movable upper metal mold 204A has a mold surface 220 bordering the flange-molding cavity section 206A so as to form a tapered inside surface 38A of the lower flange section 38. The tape reel assembly 10A is produced by providing the hub-attached lower flange 72A having the flange section 38 with the tapered inside surface 38A by the use of the mold assembly 200A in the same manner as described in connection with the previous embodiment.

In the above embodiments, although each of the mold surfaces 220 and 320 for providing the tapered inside surfaces of the lower and upper flanges 72 and 74 is described as comprised of three surface sections partitioned by the circular boundaries 222 and 224, the number of surface sections is not limited to three and may be at leas two. Furthermore, each circular boundary 222, 224 by which the adjacent surface sections are partitioned may be a transition zone convexly curved in cross-section so as to form a seamless interface between the adjacent surface sections. Otherwise, each of the mold surfaces 220 and 320 may be curved in cross-section partly or entirely over its range, in other words, may have a taper angle continuously changing partly or entirely over its range.

The present invention is not to be considered limited to the tape reel assembly 10, 10A having the reel hub body 32 formed as an integral part of the lower flange section 38 and fixedly coupled to the upper flange section 40, shown in the drawings and demonstrated in the specification and may be applied to another two-piece tape reel assembly such as having a reel hub body formed as an integral part of an upper flange section and fixedly coupled to a lower flange section, any three-piece tape reel assembly comprised of a reel hub body, an upper flange and a lower flange which are formed separately and assembled to one unit, and a single-flanged tape reel assembly comprised of a reel hub body and a single flange which are formed separately and assembled to one unit. Furthermore, the present invention is not to be considered limited to the tape cartridge 11 of single reel type such as shown in the drawings and demonstrated in the specification and may not only be applied to a double-reel type tape cartridge which has a supply reel assembly and a winding reel assembly but also to a tape reel assembly for use with a tape drive unit. In each case, the present invention may be applied to at least either one of the flanges of any tape reel assembly.

It is also to be understood that the recording tape may be a web-shaped recording medium for recording/reproducing information thereon as well as a magnetic tape and that the tape cartridge may be of any recording/reproducing system.

What is claimed is:

1. A resin injection mold assembly having a mold cavity for molding a flange of a tape reel assembly around which a recording tape is wound and which comprises a reel hub forming a cylindrical tape-winding core and at least one flange coaxially secured to, and extending radially outwardly from one of opposite axial ends of said reel hub, said flange having a tapered inside surface sloping down at a fixed taper angle from an inside periphery to an outside periphery thereof, said resin injection mold assembly comprising:
a lower mold having a mold surface for bordering at least a lower part of said mold cavity which configures an outside surface of said flange; and
an upper mold having a mold surface for bordering at least an upper part of said mold cavity which configures said tapered inside surface of said flange;
wherein said mold surface of said upper mold comprises a plurality of flat surface sections sloping at different taper angles gradually decreasing from said inside periphery to said outside periphery so as to be convex to said mold cavity.

2. The resin injection mold assembly as defined in claim 1, wherein said mold surface of said upper mold comprises at least three said flat surface sections.

* * * * *